United States Patent [19]

Ishino et al.

[11] 4,003,840

[45] Jan. 18, 1977

[54] MICROWAVE ABSORBER

[75] Inventors: Ken Ishino, Nagareyama; Takashi Watanabe, Tokyo; Yasuo Hashimoto, Ichikawa, all of Japan

[73] Assignee: TDK Electronics Company, Limited, Tokyo, Japan

[22] Filed: May 12, 1975

[21] Appl. No.: 576,697

[30] Foreign Application Priority Data

June 5, 1974 Japan .............................. 49-63786

[52] U.S. Cl. .......................... 252/62; 219/10.55 D; 252/62.51; 343/18 A

[51] Int. Cl.$^2$ .................. B65D 43/00; C04D 21/00

[58] Field of Search .......................... 252/62, 62.51; 219/10.55 D, 10.55 F; 343/18 R, 18 A

[56] References Cited

UNITED STATES PATENTS

| | | | |
|---|---|---|---|
| 2,830,162 | 4/1958 | Copson et al. | 219/10.41 |
| 3,720,951 | 3/1973 | Naito | 343/18 A |
| 3,742,176 | 6/1973 | Ishino | 219/10.55 D |
| 3,754,255 | 8/1973 | Suetake | 343/18 A |
| 3,866,009 | 2/1975 | Ishino | 219/10.55 D |

*Primary Examiner*—Mayer Weinblatt
*Assistant Examiner*—R. Eugene Varndell, Jr.
*Attorney, Agent, or Firm*—Burgess Ryan and Wayne

[57] ABSTRACT

Microwave absorber comprising a mixture of ferrite powder having particle size of less than 1.65 mm and an organic high molecular weight compound.

8 Claims, 4 Drawing Figures

MICROWAVE ABSORBER

BACKGROUND OF THE INVENTION

It is generally known to those skilled in the art that ferrites absorb microwave such as those of 500 MHz to 12 GHz to change the microwave energy to a thermal energy. The ferrite is a sintered body having the spinel structure and it is a compound having the following general formula:

$MFe_2O_4$ (wherein *M* is a divalent metal such as Mn, Ni, Cu, Zn, Mg, Co, etc.).

The use of a sintered body of the ferrite for preventing the leakage of microwave in "microwave heating oven" has been disclosed in U.S. Pat. No. 2,830,162. The microwave heating oven is a device for heating a material with microwaves generated by a microwave generating device such as magnetron. The microwave, however, can be absorbed more effectively by the powder of ferrite (ferrite powder) than the sintered body of ferrite. A mixture mainly composed of ferrite powder for use in absorbing the microwave has been disclosed in U.S. Pat. No. 3,742,176. In this patent, a mixture of ferrite powder and an insulating material such as rubber has been disclosed. The invention of this (U.S. Pat. No. 3,742,176) has been accomplished by the same inventor as one of the inventors of the present invention. The inventors of the present invention found that the effect of absorption of the microwave depends on both the frequency of microwave and the particle size of ferrite powder. Namely, the ferrite powder having a certain limited particle size can absorb more effectively microwave having a certain frequency. The present invention is based on the findings as set forth above.

SUMMARY OF THE INVENTION

The present invention relates to a microwave absorber comprising a mixture of the ferrite powder having particle size of less than 1.65 mm and an organic high molecular compound.

Said microwave is a wave having a frequency of from 500 MHz to 12 GHz. Said ferrite is a ferrimagnetic material having the general formula:

$MFe_2O_4$ wherein M is a divalent metal such as Mn, Ni, Cu, Zn, Mg, Co, etc. Said mixture comprises the ferrite powder and an insulating organic high molecular compound which are mixed in a ratio as shown below:

| | |
|---|---|
| Ferrite powder | 0.2–0.9 parts by volume |
| Organic high molecular compound | 0.8–0.1 part by volume |

As the insulating organic high molecular compound, the following resins and rubbers may be used:

Thermosetting resin such as phenol resin, polyester resin, epoxy resin and silicone resin; thermoplastic resin such as polyethylene, polypropylene and polyvinyl chloride; natural rubber and synthetic rubber such as polychloroprene, acrylonitrile-butadiene-styrene and fluorine-contained rubber.

The ferrite powder serves to absorb microwave. However, in order to form a shaped body of ferrite powder, the ferrite powder is mixed with an insulating organic high molecular weight compound. Namely, the organic high molecular compound is used as a binder of the ferrite powder.

Relations between particle sizes of ferrite powder and frequencies of microwave absorbed effectively by the ferrite powder are as follows:

1. In the event that the powders of ferrites having the initial permeability of more than 300 (the initial permeability is measured at the frequency of 10 kHz) are used;

| Particle sizes of the ferrite powder | Frequencies of the microwave absorbed effectively |
|---|---|
| 1.65 mm – 701 μ | 500 MHz – 1.5 GHz |
| 701 μ – 351 μ | 1.0 GHz – 2.0 GHz |
| 351 μ – 104 μ | 1.8 GHz – 3.0 GHz |
| 104 μ – 43 μ | 2.5 GHz – 7.5 GHz |
| <43 μ | 6.0 GHz – 12.0 GHz |

2. In the event that the powders of ferrites having the initial permeability of less than 300 (the initial permeability is measured at the frequency of 10 kHz) are used;

| Particle sizes of the ferrite powder | Frequencies of the microwave absorbed effectively |
|---|---|
| 1.65 mm – 701 μ | 1.0 GHz – 3.0 GHz |
| 701 μ – 351 μ | 2.0 GHz – 4.5 GHz |
| 351 μ – 104 μ | 4.0 GHz – 6.0 GHz |
| 104 μ – 43 μ | 5.0 GHz – 7.5 GHz |
| <43 μ | 6.0 GHz – 12.0 GHz |

As shown above, by using the powder of ferrites having the different initial permeability (i.e. more than or less than 300), the frequency range of microwave absorbed effectively shifts in some degree.

Microwave having a frequency of 2.45 GHz used in a microwave heating oven, so-called a microwave oven or an electronic oven, is absorbed effectively by the ferrite powders having particle size of from 351 μ to 104 μ (the initial permeability: >300) or from 701 μ to 351 μ (the initial permeability: <300).

In order to explain the present invention, reference is made to the accompanying drawings, in which:

FIG. 1(a) and FIG. 1(b) are drawings showing the arrangement of the microwave absorber 1 in the coaxial tube 2 (WX-14D; inner conductor 6.2 mmφ; outer conductor 14.2 mmφ), FIG. 1(a) being a longitudinal sectional view and FIG. 1(b) being a cross sectional view along the line I—I of FIG. 1(a).

In the manner as shown in FIG. 1(a) and FIG. 1(b), the attenuation (dB/cm) of the microwave absorber against microwave was measured.

FIG. 2 and FIG. 3 are a diagram showing the relation of attenuation (dB/cm) and frequency of the microwave (GHz) for the particle sizes of the ferrite powder having the initial permeability of more than 300 and less than 300 at 10 kHz, respectively.

In FIG. 2 and FIG. 3, Curves I, II, III, IV and V are those obtained by the particle size of the ferrite powder as shown below:

| Curve | Particle size |
|---|---|
| I | 1.65 mm - 701 $\mu$ |
| II | 701 $\mu$ - 351 $\mu$ |
| III | 351 $\mu$ - 104 $\mu$ |
| IV | 104 $\mu$ - 43 $\mu$ |
| V | <43 $\mu$ |

DESCRIPTION OF THE PREFERRED EMBODIMENTS

The following examples are given to illustrate the present invention.

EXAMPLE 1

The microwave absorbers of the present invention were prepared as follows:

724 g of $Fe_2O_3$, 175 g of MnO and 101 g of ZnO were each weighed out to provide a Mn-Zn-ferrite including 55 mol% of $Fe_2O_3$, 30 mol% of MnO and 15 mol% of ZnO. $Fe_2O_3$, MnO and ZnO were mixed in a ball mill for 20 hours. The mixture was compression molded at about 1 ton/cm$^2$ to form a shaped body 110 mm × 18 mm × 5 mm. The shaped body was heated at a temperature of 1,350° C for 2 hours. The resulting sintered body, i.e. Mn-Zn-ferrite, had the initial permeability of 2,500 at 10 kHz. This Mn-Zn-ferrite was pulverized for 2 hours using a stamp mill to give Mn-Zn-ferrite powder. The resulting ferrite powder was sifted through eight sieves of different mesh such as 10, 24, 42, 150 and 325 mesh to obtain ferrite powder having different particle sizes as follows:

| No. | Pass through the sieve of | Not pass through the sieve of | Particle size of ferrite powder |
|---|---|---|---|
| 1 | 10 mesh | 24 mesh | 1.65 mm - 701$\mu$ |
| 2 | 24 " | 42 " | 701$\mu$ - 351$\mu$ |
| 3 | " | 150 " | 351$\mu$ - 104$\mu$ |
| 4 | 150 " | 325 " | 104$\mu$ - 43$\mu$ |
| 5 | 325 " | | <43$\mu$ |

Each shifted ferrite powder Nos. 1–5 obtained above was mixed with silicone resin in the ratio of 9 (ferrite powder) to 1 (silicone resin) by volume. Each mixture was compression molded at about 100 kg/cm$^2$ to form a shaped body having an inside diameter of 6.2 mm, an outside diameter of 14.2 mm and a thickness of 3 mm. Each shaped body was heated at a temperature of 100° C for 2 hours to provide Microwave absorbers Nos. 1–5 of the present invention.

Figure 1A:
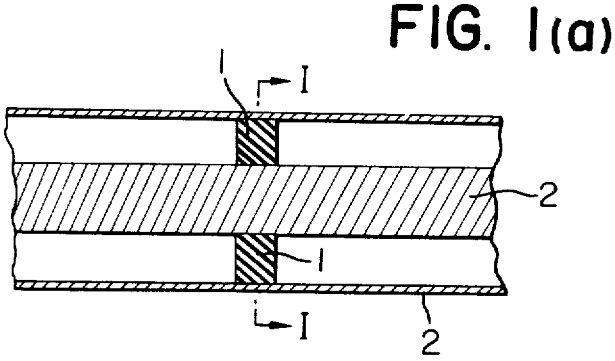
Figure 1B:
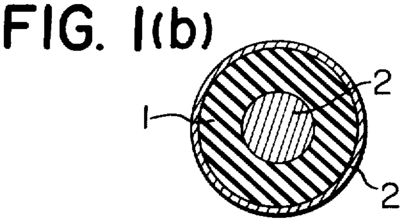
Figure 1B:
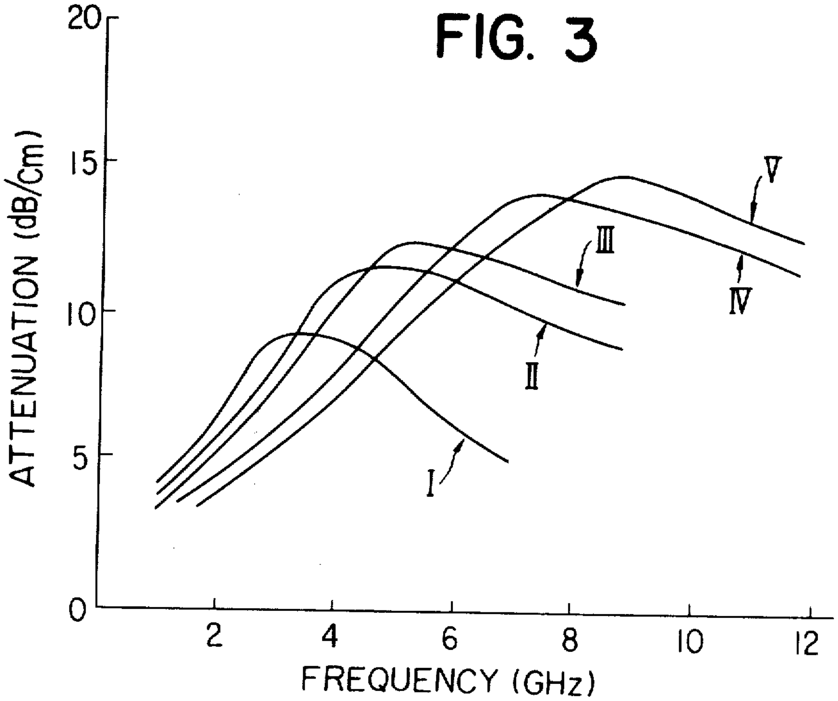

In the manner as shown in FIG. 1(a) and FIG. 1(b), the attenuations (dB/cm) of Microwave absorbers No. 1 – 5 against microwaves of different frequencies such as 500 MHz, 1 GHz, 2.45 GHz, 4 GHz, 6 GHz and 12 GHz were measured, and the following results were obtained:

TABLE 1

| Microwave absorber No. | Attenuation (dB/cm) Frequency | | | | | |
|---|---|---|---|---|---|---|
| | 500 MHz | 1 GHz | 2.45 GHz | 4 GHz | 6 GHz | 12 GHz |
| 1 | 5.3 | 8.8 | 6.5 | 5.0 | 3.8 | 3.3 |
| 2 | 3.0 | 7.8 | 11.0 | 9.5 | 8.2 | 7.2 |
| 3 | 3.5 | 7.6 | 14.4 | 15.4 | 13.5 | 12.0 |
| 4 | 1.4 | 4.6 | 13.3 | 19.0 | 24.5 | 23.0 |
| 5 | 0.5 | 2.8 | 11.0 | 18.0 | 23.0 | 26.0 |

Figure 2:
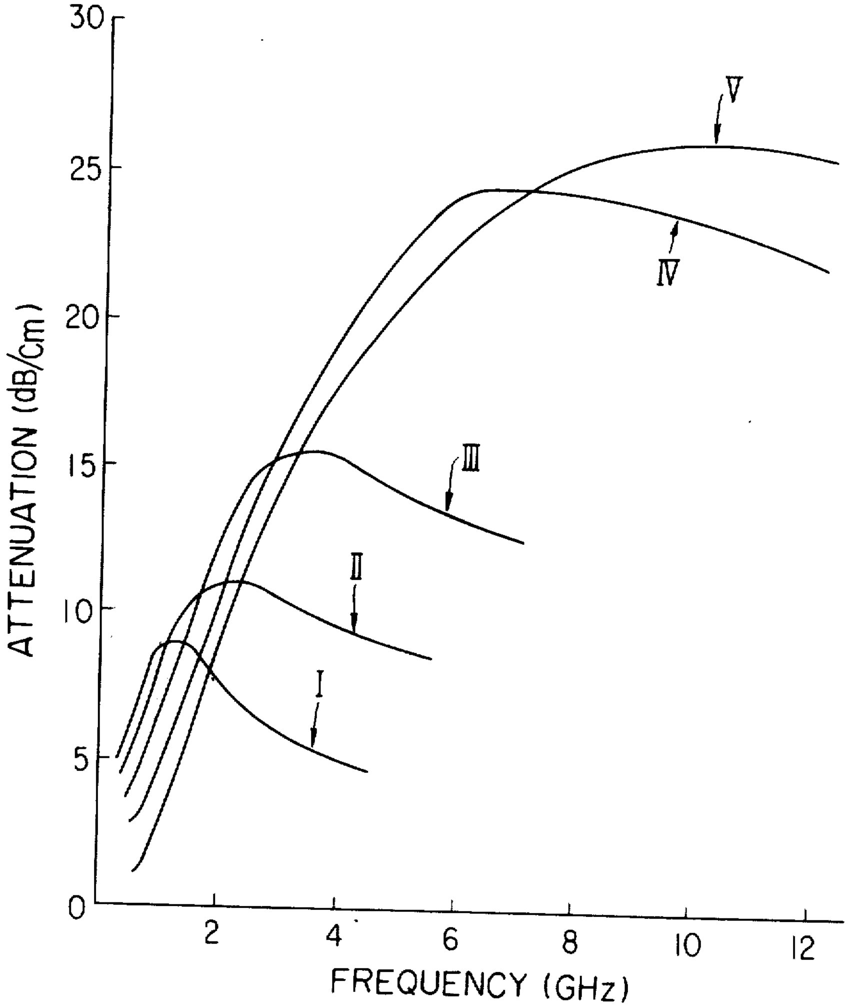

The resulting attenuations of Microwave absorbers Nos. 1, 2, 3, 4 and 5 are rspectively shown by Curves I, II, III, IV and V in FIG. 2.

EXAMPLE 2

Microwave absorbers Nos. 6–10 were prepared by repeating the same procedure as that shown in Example 1 except that:

1. 739 g of $Fe_2O_3$, 119 g of NiO, 136 g of ZnO and 6 g of CoO were used to provide a Ni-Zn-Co-ferrite including 58 mol% of $Fe_2O_3$, 20 mol% of NiO, 21 mol% of ZnO and 1 mol% of CoO instead of the Mn-Zn-ferrite of Example 1,
2. the shaped body was heated at a temperature of 1,250° C to a ferrite sintered body,
3. polychloroprene (chloroprene rubber) was used instead of silicone resin as a binder, and
4. the mixture of ferrite powder and binder was heated at a temperature of 175° C for 2 minutes.

The resulting Ni-Zn-Co-ferrite had the initial permeability of 150 at 10kHz.

In the same manner as that described in Example 1, the attenuations (dB/cm) of Microwave absorbers No. 6 – 10 were measured, and the following results were obtained:

TABLE 2

| Microwave absorber No. | Attenuation (dB/cm) Frequency | | | | | | |
|---|---|---|---|---|---|---|---|
| | 1 GHz | 2 GHz | 2.45 GHz | 4 GHz | 6 GHz | 8 GHz | 12 GHz |
| 6 | 3.5 | 6.2 | 8.0 | 8.8 | 6.0 | | |
| 7 | 3.0 | 5.6 | 6.8 | 11.0 | 11.0 | 9.5 | |
| 8 | 2.8 | 5.4 | 6.5 | 10.0 | 12.3 | 11.0 | |
| 9 | | | 5.0 | 8.4 | 12.6 | 14.0 | 13.0 |
| 10 | | | 4.0 | 7.3 | 11.2 | 14.4 | 14.0 |

The resulting attenuations of Microwave absorbers Nos. 6, 7, 8, 9 and 10 are respectively shown by Curves I, II, III, IV and V in FIG. 3.

Microwave absorbers Nos. 11 and 12 for use in comparative tests were provided as follows:

Microwave absorber No. 11 was prepared by repeating the same procedure as that of Example 1 except that Mn-Zn-ferrite powder having particle size of from 3$\mu$ to 2 mm was used. Such ferrite powder was obtained by sifting the pulverized ferrite through a sieve of 6 mesh.

Microwave absorber No. 12 was prepared by repeating the same procedure as that of Example 2 except that Ni-Zn-Co-ferrite powder having particle size of from 3μ to 2 mm was used in the same manner as that shown in providing Microwave absorber No. 11.

In the same manner as that described in Example 1, the attenuations (dB/cm) of Microwave absorbers No. 11 and No. 12 were measured, and the following results were obtained:

TABLe 3

| Microwave absorber No. | Attenuation (dB/cm) Frequency 500 MHz | 1 GHz | 2.45 GHz | 4 GHz | 6 GHz |
|---|---|---|---|---|---|
| 11 | 5.5 | 4.8 | 3.5 | 3.3 | 3.0 |
| 12 | 3.8 | 4.2 | 3.3 | 2.8 | 2.5 |

As can be seen from the results as obtained above, microwave of a certain frequency is absorbed more effectively by ferrite powder having a certain limited particle size as hereinbefore described.

In the above Examples 1 and 2, the effects of the present invention was illustrated by using the powders of Mn-Zn-ferrite and Ni-Zn-Co-ferrite.

However, ferrites having high or low initial permeability can be obtained by using divalent metals such as Cu and Mg instead of Mn and Ni, and similar results to those described in Examples 1 and 2 can be obtained by using powders of Cu-Zn-ferrite and Mg-Zn-ferrite.

Many kinds of ferrites can be obtained by changing composition and process of production of ferrite. The powders of the ferrites thus obtained can be used in the present invention in the same manner as that described in Examples 1 and 2.

We claim:

1. A microwave absorber consisting essentially of a mixture of from 0.2 to 0.9 part by volume of a ferrite powder and from 0.8 to 0.1 part by volume of an organic high molecular compound, said ferrite powder being a powder having a particle size of less than 1.65 mm of a ferrite having the general formula $MFe_2O_4$ in which M is selected from the group consisting of manganese, nickel, copper, zinc, magnesium and cobalt and having an initial permeability of more than 300 at 10 kHz, said organic high molecular compound being a thermosetting resin selected from the group consisting of phenol resin, polyester resin, epoxy resin and silicone resin; or a thermoplastic resin selected from the group consisting of polyvinyl chloride, polyethylene and polypropylene; or a natural and synthetic rubber selected from the group consisting of polychloroprene, acrylonitrile-butadiene-styrene and fluorine-contained rubber, said ferrite powder in a certain particle size range being used for absorbing the microwave in a certain frequency range as shown below:

| Particle size of ferrite powder | Frequency of microwave |
|---|---|
| 1.65 mm - 701 μ | 500 MHz - 1.5 GHz |
| 701 μ - 351 μ | 1.0 GHz - 2.0 GHz |
| 351 μ - 104 μ | 1.8 GHz - 3.0 GHz |
| 104 μ - 43 μ | 2.5 GHz - 7.5 GHz |
| <43 μ | 6.0 GHz - 12.0 GHz. |

2. A microwave absorber according to claim 1 wherein the organic high molecular weight compound is at least one member selected from the group consisting of a thermosetting resin selected from a group consisting of phenol resin, polyester resin, epoxy resin and silicone resin; thermoplastic resin selected from the group consisting of polyvinyl chloride, polyethylene and polypropylene; natural rubber and synthetic rubber selected from the group consisting of polychloroprene, acrylonitrile-butadiene-styrene and fluorine-contained rubber.

3. A microwave absorber according to claim 1 wherein the ferrite powder and the organic high molecular weight compound are mixed in a ratio as shown below:

| | |
|---|---|
| Ferrite powder | 0.2 - 0.9 part by volume |
| Organic high weight compound | 0.8 - 0.1 part by volume |

4. A microwave absorber according to claim 1 in which said divalent metal is a member selected from the group consisting of manganese, nickel, copper, zinc, magnesium and cobalt.

5. A microwave absorber consisting essentially of a mixture of from 0.2 to 0.9 part by volume of a ferrite powder and from 0.8 to 0.1 part by volume of an organic high molecular compound, said ferrite powder being a powder having a particle size of less than 1.65 mm of a ferrite having the general formula $MFe_2O_4$ in which M is selected from the group consisting of manganese, nickel, copper, zinc, magnesium and cobalt and having an initial permeability of less than 300 at 10 kHz, said organic high molecular compound being a thermosetting resin selected from the group consisting of phenol resin, polyester resin, epoxy resin and silicone resin; or a thermoplastic resin selected from the group consisting of polyvinyl chloride, polyethylene and polypropylene; or a natural and synthetic rubber selected from the group consisting of polychloroprene, acrylonitrile-butadiene-styrene and fluorine-contained rubber, said ferrite powder in a certain particle size range being used for absorbing the microwave in a certain frequency range as shown below:

| Particle size of ferrite powder | Frequency of microwave |
|---|---|
| 1.65 mm - 701 μ | 1.0 GHz - 3.0 GHz |
| 701 μ - 351 μ | 2.0 GHz - 4.5 GHz |
| 351 μ - 104 μ | 4.0 GHz - 6.0 GHz |
| 104 μ - 43 μ | 5.0 GHz - 7.5 GHz |
| <43 μ | 6.0 GHz - 12.0 GHz. |

6. A microwave absorber according to claim 5 wherein said divalent metal is a member selected from the group consisting of manganese, nickel, copper, zinc, magnesium and cobalt.

7. A microwave absorber according to claim 5 wherein the organic high molecular weight compound is at least one member selected from the group consisting of a thermal setting resin selected from the group consisting of phenol resin, polyester resin, epoxy resin and silicone resin; thermoplastic resins selected from the group consisting of polyvinyl chloride, polyethylene and polypropylene; natural and synthetic rubber selected from the group consisting of polychloroprene, acrylonitrile-butadiene-styrene and fluorine-contained rubber.

8. A microwave absorber according to claim 5 wherein the ferrite powder and the organic high molecular weight compounds are mixed in the following ratio:

| | |
|---|---|
| ferrite powder | 0.2–0.9 parts by volume |
| organic high molecular weight compound | 0.8–0.1 part by volume. |

* * * * *

UNITED STATES PATENT OFFICE
CERTIFICATE OF CORRECTION

Patent No. 4,003,840 Dated January 18, 1977

Inventor(s) Ken Ishino, et al

It is certified that error appears in the above-identified patent and that said Letters Patent are hereby corrected as shown below:

Column 1, line 43: Change "high molecular compound" to --high molecular weight compound--.

Column 1, line 56: Change "parts" to --part--.

Column 3, in the tabulation appearing at line 60, in the second column, the third item should be --42--.

Column 6, line 16: Change "Organic high weight" to --Organic high molecular weight--.

Signed and Sealed this

*twenty-sixth* Day of *July 1977*

[SEAL]

*Attest:*

RUTH C. MASON
*Attesting Officer*

C. MARSHALL DANN
*Commissioner of Patents and Trademarks*